US012701139B2

(12) United States Patent
Raj

(10) Patent No.: US 12,701,139 B2
(45) Date of Patent: *Aug. 4, 2026

(54) DEPLOYING SESSION INITIATION PROTOCOL APPLICATION NETWORK SECURITY

(71) Applicant: The MITRE Corporation, McLean, VA (US)

(72) Inventor: Alex E. Raj, McLean, VA (US)

(73) Assignee: The MITRE Corporation, McLean, VA (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/999,419

(22) Filed: Dec. 23, 2024

(65) Prior Publication Data

US 2025/0133114 A1 Apr. 24, 2025

Related U.S. Application Data

(63) Continuation of application No. 18/507,793, filed on Nov. 13, 2023, now Pat. No. 12,184,695, which is a
(Continued)

(51) Int. Cl.
*G06F 7/04* (2006.01)
*H04L 9/40* (2022.01)
(Continued)

(52) U.S. Cl.
CPC .......... *H04L 63/168* (2013.01); *H04L 63/166* (2013.01); *H04L 65/1069* (2013.01); *H04L 65/1104* (2022.05); *H04L 69/16* (2013.01)

(58) Field of Classification Search
CPC ... H04L 63/168; H04L 63/166; H04L 63/308; H04L 63/1408; G06F 21/55; G06F 21/56; G06F 21/577; G06F 21/60; G06F 21/606
See application file for complete search history.

(56) References Cited

U.S. PATENT DOCUMENTS 7,904,954 B2    3/2011  Liu et al.
8,023,979 B2*   9/2011  Sung ..................... H04W 8/186
                                                    370/401
(Continued)

FOREIGN PATENT DOCUMENTS

KR        10-1011223  B1      1/2011

OTHER PUBLICATIONS

Shrestha, Security of SIP-Based Infrastructure Against Malicious Message Attacks, IEEE, Dec. 20, 2014, pp. 1-8. (Year: 2014).*
(Continued)

*Primary Examiner* — Philip J Chea
*Assistant Examiner* — Jenise E Jackson
(74) *Attorney, Agent, or Firm* — Morrison & Foerster LLP

(57) ABSTRACT

Described are systems, methods, and computer-program product embodiments for providing Session Initiation Protocol (SIP) network security. In some embodiments, a SIP processing system includes a SIP device configured to receive a packet stream from a first SIP user agent and facilitate a SIP communication session between the first SIP user agent and a second SIP user agent. The SIP device receives the SIP messages in the SIP communication session and opens one or more socket connections with one or more security systems. The SIP device transmits metadata of the SIP messages to the one or more security systems configured to detect threats. Based on a threat status generated by and received from the one or more security systems, the SIP device controls the SIP communication session.

24 Claims, 6 Drawing Sheets

Related U.S. Application Data continuation of application No. 16/924,451, filed on Jul. 9, 2020, now Pat. No. 11,831,681, which is a continuation of application No. 16/146,691, filed on Sep. 28, 2018, now Pat. No. 10,749,900.

(51) Int. Cl.
  *H04L 65/1069* (2022.01)
  *H04L 65/1104* (2022.01)
  *H04L 69/16* (2022.01)

(56) References Cited

U.S. PATENT DOCUMENTS

| | | | |
|---|---|---|---|
| 8,037,531 B2 | 10/2011 | Yeom | |
| 8,261,307 B1 * | 9/2012 | Islam | H04N 21/4383 |
| | | | 725/62 |
| 8,266,693 B1 | 9/2012 | Gnanasekar et al. | |
| 8,307,418 B2 | 11/2012 | Devdhar et al. | |
| 8,447,855 B2 | 5/2013 | Chesla | |
| 8,464,329 B2 | 6/2013 | Fogel | |
| 8,752,174 B2 | 6/2014 | Buford et al. | |
| 8,806,630 B2 | 8/2014 | Qiu et al. | |
| 9,407,451 B1 | 8/2016 | Mistry et al. | |
| 9,736,172 B2 * | 8/2017 | Garg | H04L 63/1416 |
| 2006/0294112 A1 | 12/2006 | Mandato et al. | |
| 2007/0285205 A1 * | 12/2007 | Matsumoto | H04L 65/765 |
| | | | 340/3.1 |
| 2008/0259909 A1 * | 10/2008 | Runeson | H04L 65/1104 |
| | | | 370/352 |
| 2009/0047985 A1 | 2/2009 | Wang | |
| 2010/0131656 A1 | 5/2010 | Tsym | |
| 2010/0154057 A1 | 6/2010 | Ko et al. | |
| 2011/0235520 A1 | 9/2011 | Maciej et al. | |
| 2013/0170404 A1 | 7/2013 | Balaji et al. | |
| 2013/0196640 A1 | 8/2013 | Wang et al. | |
| 2014/0153707 A1 | 6/2014 | Rais et al. | |
| 2014/0301250 A1 | 10/2014 | Uzelac et al. | |
| 2016/0134666 A1 | 5/2016 | Ethier et al. | |
| 2017/0026512 A1 | 1/2017 | Ezell et al. | |
| 2017/0134357 A1 * | 5/2017 | Ohlsson | H04L 63/08 |
| 2019/0045055 A1 | 2/2019 | Smith et al. | |
| 2019/0196676 A1 * | 6/2019 | Hillis | H04L 67/146 |

OTHER PUBLICATIONS

Werapun et al., Solution Analysis for SIP Security Threats, IEEE, Apr. 4, 2009, pp. 1-7. (Year: 2009).*

Fasson et al. (2009). "Solution Analysis for SIP Security Threats" IEEE Xplore. 7 pages.

Lee et al. "An IMS-based Testbed for Real-time Services Integration and Orchestration", 2009 IEEE Asia-Pacific Services Computing Conference, Dec. 7-11, 2009 Biopolis, Singapore; pp. 260-266.

Shrestha (2014). "Security of SIP-Based Infrastructure against Malicious Message Attacks" IEEE Xplore. 8 pages.

* cited by examiner

DEPLOYING SESSION INITIATION PROTOCOL APPLICATION NETWORK SECURITY

CROSS REFERENCE TO RELATED APPLICATIONS

This application is a continuation of U.S. application Ser. No. 18/507,793, filed Nov. 13, 2023, which is a continuation of U.S. application Ser. No. 16/924,451, filed Jul. 9, 2020, and which issued as U.S. Pat. No. 11,831,681 on Nov. 28, 2023, which is a continuation application of U.S. patent application Ser. No. 16/146,691, filed Sep. 28, 2018, and which issued as U.S. Pat. No. 10,749,900 on Aug. 18, 2020, the entire contents of each of which are herein incorporated by reference.

STATEMENT REGARDING FEDERALLY SPONSORED RESEARCH OR DEVELOPMENT

This invention was made with government support under U.S. Government contract FA8702-18-0001 awarded by the U.S. Department of the Air Force. The Government has certain rights in this invention.

FIELD OF THE DISCLOSURE

This disclosure relates generally to system and methods for securing network communications and, more particularly, for securing network communications that use Session Initiation Protocol (SIP).

BACKGROUND OF THE DISCLOSURE

The Session Initiation Protocol (SIP) is a signaling protocol that is currently widely used for establishing, managing, and terminating multimedia communications over Internet Protocol (IP) networks. SIP-based applications utilize SIP to provide multimedia communication services such as Voice over Internet Protocol (VoIP), instant messaging, conferencing (e.g., audio, web, or video conferencing), data sharing, unified communications (e.g., integrated voicemail, e-mail, SMS, or fax), IP Television (IPTV), or presence information (telepresence) sharing.

Because SIP is a text-based protocol that operates over IP networks, much like the Hypertext Transfer Protocol (HTTP), SIP-based communications are also vulnerable to similar types of cybersecurity threats. However, traditional network firewalls are ineffective at protecting SIP-based communications from cybersecurity threats. This is, in part, because SIP is an application level protocol that operates at the session layer (i.e., layer 5) of the Open Systems Interconnection (OSI) model.

Moreover, many SIP service providers implement different versions of SIP, which introduces additional threat vectors specific to the SIP version. In fact, there currently exists hundreds of Request for Comments (RFCs) related to SIP, each of which may specify optional SIP-related features. As a result, current security systems often cannot parse SIP messages to secure SIP-related communications.

SUMMARY OF THE DISCLOSURE

As discussed above, current network security systems and firewalls are limited in their ability to secure SIP-based communications against cybersecurity threats. Accordingly, there is a need for systems, methods, and computer program product embodiments to secure SIP-based communications.

In some embodiments, a SIP device such as a Session Recording Client (SRC) can be provided to establish and manage a SIP communication session between a first and a second SIP user agent. In some embodiments, the SIP device establishes a recording session with a first server such as a Session Recording Server (SRS) for archiving SIP signaling and multimedia data transmitted in the SIP communication session. In some embodiments, the SIP signaling includes a SIP message stream of one or more SIP messages. In some embodiments, the first server can decode the SIP message stream to extract data content based on metadata in the one or more SIP messages. In some embodiments, the first server opens a socket connection with a security system to establish a security session based on metadata received in the recording session. Then, the first server can transmit a portion of the decoded SIP messages to the security system using the socket connection. In some embodiments, the first server receives a threat status from the security system indicating whether the transmitted portion is associated with a detected threat. In some embodiments, the first server controls the SIP communication session based on the received threat status.

In some embodiments, a SIP device such as a Session Recording Client (SRC) can be provided to establish and manage a SIP communication session between a first and a second SIP user agent. In some embodiments, the SIP communication session includes transmitted SIP signaling and multimedia data. In some embodiments, the SIP signaling includes a SIP message stream of one or more SIP messages. In some embodiments, the SIP device opens a socket connection with a security system to establish a security session. Then, the SIP device can transmit metadata in the SIP messages and describing the SIP communication session to the security system using the socket connection. In some embodiments, the SIP device receives a threat status from the security system indicating whether the transmitted metadata is associated with a detected threat. In some embodiments, the SIP device controls the SIP communication session based on the received threat status.

In some embodiments, a method for providing Session Initiation Protocol (SIP) network security includes: at a first server: establishing a recording session with a SIP device configured to facilitate a SIP communication session between a first SIP user agent and a second SIP user agent to relay SIP messages between the first and second SIP user agents, wherein the SIP messages comprise encapsulated multimedia content, first metadata describing the SIP communication session, and second metadata describing the multimedia content; receiving the SIP messages from the SIP device during the recording session; decoding the SIP messages based on the second metadata to extract the multimedia content from the SIP messages; opening a socket connection with a security system to establish a security session based on the first metadata; transmitting a portion of the multimedia content to the security system using the socket connection; receiving a threat status from the security system indicating whether the transmitted portion is associated with a detected threat; and controlling the SIP communication session based on the received threat status.

In some embodiments, the threat status indicates that the transmitted portion is associated with the detected threat, and wherein controlling the SIP communication session includes: terminating the SIP communication session between the first and second SIP user agents.

In some embodiments, transmitting the portion of the multimedia content includes: determining whether to archive the multimedia content based on the first metadata or the second metadata; and in response to determining to archive the multimedia content, archiving the multimedia content in association with the recording session, wherein the portion of transmitted multimedia content comprises the archived multimedia content.

In some embodiments, the threat status indicates that the transmitted portion is associated with the detected threat, and the method includes: notifying the threat status to an operator.

In some embodiments, the first and second metadata comprise Session Decision Protocol (SDP) attributes.

In some embodiments, the first metadata comprises user identifiers of the first and second SIP user agents and a status of the SIP communication session. In some embodiments, the first metadata comprises a security attribute indicating a need for security processing of the SIP communication session.

In some embodiments, establishing the security session includes: in response to receiving the security attribute, opening the socket connection with the security system based on the recording session.

In some embodiments, the method includes: determining whether to establish a plurality of security sessions with a plurality of corresponding security systems during the recording session based on the security attribute and the second metadata.

In some embodiments, the method includes: in response to determining to establish the plurality of security sessions with the plurality of corresponding security systems, opening a separate socket connection to a corresponding security system for each security session.

In some embodiments, the first server includes a Session Recording Server, a SIP media gateway, a Session Border Controller (SBC), SIP Application Layer Gateway (ALG), a SIP phone, a SIP media server integrated with an application server, or a SIP application server.

In some embodiments, the recording session is a SIP session.

In some embodiments, the multimedia content comprises audio data, video data, or textual data.

In some embodiments, the socket connection is a Transport Control Protocol (TCP) socket connection.

In some embodiments, a system for providing Session Initiation Protocol (SIP) network security includes: one or more processors; and memory storing one or more programs that when executed by the one or more processors cause the one or more processors to: establish a recording session with a SIP device configured to facilitate a SIP communication session between a first SIP user agent and a second SIP user agent to relay SIP messages between the first and second SIP user agents, wherein the SIP messages comprise encapsulated multimedia content, first metadata describing the SIP communication session, and second metadata describing the multimedia content; receive the SIP messages from the SIP device during the recording session; decode the SIP messages based on the second metadata to extract the multimedia content from the SIP messages; open a socket connection with a security system to establish a security session based on the first metadata; transmit a portion of the multimedia content to the security system using the socket connection; receive a threat status from the security system indicating whether the transmitted portion is associated with a detected threat; and control the SIP communication session based on the received threat status.

In some embodiments, a system for deploying Session Initiation Protocol (SIP) application network security includes: a SIP device configured to: facilitate a SIP communication session between a first SIP user agent and a second SIP user agent; relay SIP messages between the first and second user devices during the communication session, wherein the SIP messages comprise encapsulated multimedia content, first metadata describing the SIP communication session, and second metadata describing the multimedia content; establish a recording session with a first server based on the first metadata; and transmit the SIP messages to the first server based on the recording session; and wherein the first server is configured to: receive the SIP messages from the SIP device during the recording session; decode the SIP messages based on the second metadata to extract the multimedia content in the SIP messages; open a socket connection with a security system to establish a security session based on the first metadata; transmit a portion of the multimedia content to the security system using the socket connection; receive a threat status from the security system indicating whether the transmitted portion is associated with a detected threat; and control the SIP communication session based on the received threat status.

In some embodiments, a non-transitory computer-readable storage medium comprising instructions for providing Session Initiation Protocol (SIP) network security, wherein the instructions, when executed by one or more processors, cause the one or more processors to perform instructions comprising: establishing a recording session with a SIP device configured to facilitate a SIP communication session between a first SIP user agent and a second SIP user agent to relay SIP messages between the first and second SIP user agents, wherein the SIP messages comprise encapsulated multimedia content, first metadata describing the SIP communication session, and second metadata describing the multimedia content; receive the SIP messages from the SIP device during the recording session; decode the SIP messages based on the second metadata to extract the multimedia content from the SIP messages; open a socket connection with a security system to establish a security session based on the first metadata; transmit a portion of the multimedia content to the security system using the socket connection; receive a threat status from the security system indicating whether the transmitted portion is associated with a detected threat; and control the SIP communication session based on the received threat status.

In some embodiments, a method for providing Session Initiation Protocol (SIP) network security, includes: establishing a recording session with a SIP device configured to facilitate a SIP communication session between a first SIP user agent and a second SIP user agent to relay SIP messages between the first and second SIP user agents, wherein the SIP messages comprise metadata describing the SIP communication session; receiving the SIP messages from the SIP communication session; opening a socket connection with a security system to establish a security session; transmitting the metadata to the security system using the socket connection; receiving a threat status from the security system indicating whether the transmitted metadata is associated with a detected threat; and controlling the SIP communication session based on the received threat status.

In some embodiments, the threat status indicates that the transmitted metadata is associated with the detected threat, and wherein controlling the SIP communication session includes: terminating the SIP communication session between the first and second SIP user agents.

In some embodiments, the threat status indicates that the transmitted metadata is associated with the detected threat, includes: notifying the threat status to an operator.

In some embodiments, the metadata comprises Session Decision Protocol (SDP) attributes.

In some embodiments, the metadata comprises user identifiers of the first and second SIP user agents and a status of the SIP communication session.

In some embodiments, the method includes: determining whether to establish a plurality of security sessions with a plurality of corresponding security systems during the SIP communication session.

In some embodiments, the socket connection is a Transport Control Protocol (TCP) socket connection.

In some embodiments, a system for providing Session Initiation Protocol (SIP) network security includes: one or more processors; and memory storing one or more programs that when executed by the one or more processors cause the one or more processors to: establish a recording session with a SIP device configured to facilitate a SIP communication session between a first SIP user agent and a second SIP user agent to relay SIP messages between the first and second SIP user agents, wherein the SIP messages comprise metadata describing the SIP communication session; receiving the SIP messages from the SIP communication session; opening a socket connection with a security system to establish a security session; transmitting the metadata to the security system using the socket connection; receiving a threat status from the security system indicating whether the transmitted metadata is associated with a detected threat; and controlling the SIP communication session based on the received threat status.

In some embodiments, a non-transitory computer-readable storage medium comprising instructions for providing Session Initiation Protocol (SIP) network security, wherein the instructions, when executed by one or more processors, cause the one or more processors to perform instructions comprising: establishing a recording session with a SIP device configured to facilitate a SIP communication session between a first SIP user agent and a second SIP user agent to relay SIP messages between the first and second SIP user agents, wherein the SIP messages comprise metadata describing the SIP communication session; receiving the SIP messages from the SIP communication session; opening a socket connection with a security system to establish a security session; transmitting the metadata to the security system using the socket connection; receiving a threat status from the security system indicating whether the transmitted metadata is associated with a detected threat; and controlling the SIP communication session based on the received threat status.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTIONS OF THE FIGURES

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings:

FIG. 1 illustrates a system for providing Session Initiation Protocol (SIP) services and securing SIP-based communications, according to some embodiments;

FIGS. 2A-B illustrate systems for securing SIP-based communications, according to some embodiments;

DETAILED DESCRIPTION OF THE DISCLOSURE

Described herein are systems, methods, apparatuses, and computer program product embodiments for deploying SIP application network security. Embodiments include providing a SIP processing system configured to establish a SIP communication session between SIP user agents and control the SIP communication session based on communications with a security system. In some embodiments, SIP processing system includes a Session Recording Client (SRC) for establishing, managing, and terminating the SIP communication session. In some embodiments, managing the SIP communication session includes replicating the SIP signaling and data streams in the SIP communication session for forwarding to a Session Recording Server (SRS). In some embodiments, the SRS decodes one or more SIP messages in the SIP signaling based on metadata in the one or more of the SIP messages to extract data content from the one or more SIP messages. In some embodiments, the SRS establishes a socket connection with the security system to establish a security session. Then, the SRS transmits a portion of the extracted data content of the one or more SIP messages to the security system configured to determine whether the extracted data content is associated with a security threat. In some embodiments, the SRS controls the SIP communication session based on a threat status received from the security system. For example, the SRS may request the SRC to terminate the SIP communication session between the SIP user agents if the threat status indicates that the extracted data content is associated with the security threat.

Figure 1:
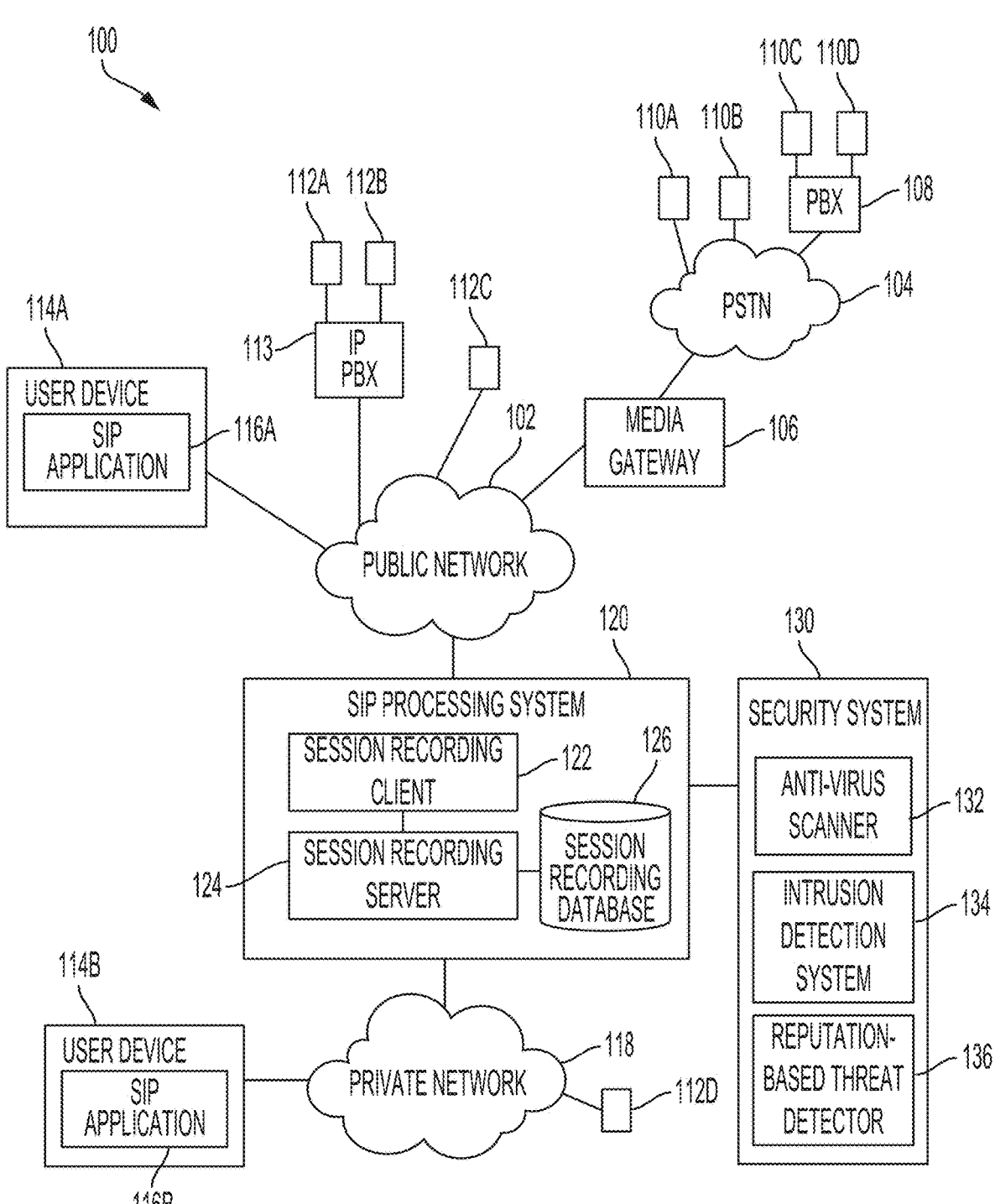

FIG. 1 illustrates a system 100 for providing SIP services and securing SIP-based communications, according to some embodiments. System 100 includes a plurality of SIP user agents (e.g., media gateway 106, IP phones 112A-D, and user devices 114A-B) that implement SIP to communicate multimedia content with each other through public network 102. In some embodiments, public network 102 is a public Internet Protocol (IP) network that may include a Wide Area Network (WAN) such as the Internet, a mobile network (e.g., an LTE or a 3G network), or a wireless network such as WiFi, etc.

In some embodiments, media gateway 106 can be a SIP server that converts between a traditional connection in a Public Switched Telephone Network (PSTN) and a Voice over Internet Protocol (VoIP) connection through public network 102 using SIP. In particular, media gateway 106 may enable landline phones 110A-B and landline phones 110C-D of Private Branch Exchange (PBX) 108 to communicate (e.g., initiate a voice call or a conference call) with SIP user agents such as IP phones 112A-D and user devices 114A-B through public network 102. In contrast to landline phones 110A-D, IP phones 112A-D can be software-based softphones or purpose-built hardware devices capable of establishing communication sessions with other SIP user agents through public network 102. For example, IP phones 112A-B may access public network 102 through IP PBX 113. In some embodiments, one or more IP phones 112A-D may be configured to implement media protocols such as Real-time Transport Protocol (RTP) to transmit and receive media streams during the SIP communication sessions.

In some embodiments, user devices 114A-B may include a desktop computer, a laptop computer, or a handheld computer (e.g., a mobile phone) configured to implement a corresponding SIP application 116A-B. SIP applications 114-B may be a Unified Communications (UC) application capable of providing a plurality of communication services using SIP. Such services may include instant messaging (e.g., chat), data sharing, unified messaging (e.g., integrated voicemail, e-mail, SMS, or fax), IP Television (IPTV), presence information (telepresence), and conferencing services (e.g., audio, web, or video).

In some embodiments, SIP user agents can be configured to communicate with a set of SIP infrastructure devices (not shown) to access or provide SIP services using public network 102. Such SIP infrastructure devices may include one or more of each of a SIP proxy server, a SIP PBX, a Registrar, or a Redirect server, as is well understood by a person skilled in the art.

In some embodiments, a SIP processing system 120 is provided to establish, manage, and terminate SIP communications between SIP user agents (e.g., user device 114B and IP phone 112D) in a private network 118 and SIP user agents in public network 102. Private network 118 may include a Local Area Network (LAN), a wireless network (e.g., WiFi), etc. where coupled devices utilize private IP addresses. In some embodiments, SIP processing system can implement a back-to-back user agent (B2BUA) to enable additional functions such as call forwarding and transfer and session recording for SIP communications between two or more SIP user agents. In some embodiments, the B2BUA can be configured to provide these additional functions by dividing a SIP communication session between two SIP user agents into two communication legs to mediate and control SIP signaling between the two SIP user agents.

In some embodiments, by establishing and managing the two communication legs for each SIP communication session between the two SIP user agents, SIP processing system 120 can be configured to implement a variety of functions such as topology and carrier hiding, signaling protocol inter-working, protocol validation, carrier tech prefix insertion/removal, as well as codec transcoding, etc. In some embodiments, SIP processing system 120 can be configured to control SIP signaling as well as media streams being transmitted in each communication leg of the SIP communication session, as will be further described below. In some embodiments, SIP processing system 120 can be configured to interface with security system 130 to access the rich data security capabilities provided at security system 130, as will be further described below.

In some embodiments, SIP processing system 120 can be implemented as a Session Border Controller (SBC) or a SIP device integrated with a SIP Application Layer Gateway (ALG) that initiate, mediate, and terminate SIP communication sessions between SIP user agents in private network 118 and SIP user agents in public network 102. In some embodiments, the SBC and the SIP ALG are each B2BUA devices capable of providing basic network security for SIP voice communications. For example, the SIP ALG component in the SIP device (e.g., a LAN router or gateway) may be configured to unpack SIP messages in the SIP communications to perform protocol packet-inspection of the SIP messages to determine whether each SIP message complies with the SIP protocol.

In some embodiments, to secure SIP-based communications, SIP processing system 120 includes Session Recording Client (SRC) 122, Session Recording Server (SRS) 124, and session recording database 126. In some embodiments, SRC 122 can be a SIP server or device such as a SBC or SIP ALG. In some embodiments, SRC 122 can be coupled to SRC 124 through private network 118. In some embodiments, SRC 122 can communicate with SRC 124 through public network 102.

In some embodiments, SRC 122 can be a SIP device configured to facilitate (e.g., establish, manage, and terminate) a SIP communication session between SIP user agents in public network 102 and SIP user agents in private network 118 to relay a packet stream between the SIP user agents. In some embodiments, the packet stream can include a SIP message stream including one or more SIP messages that SRC 122 can analyze to establish and control the SIP communication session.

In some embodiments, a SIP message can include metadata that specifies how multimedia content is to be transmitted as well as whether the SIP message includes a message body that encapsulates data content. In some embodiments, the metadata may be included in a header of the SIP message. The metadata in the header may describe the SIP communication session as well as any message body. For example, metadata describing the message body may include information specifying one or more of a content type (e.g., media type of the message body such as Session Description Protocol (SDP) data or simple text), a content length (i.e., a size of the message body in octets), a content language (e.g., English), a content encoding (e.g., QZIP), or a content disposition (e.g., how to process the message body). In some embodiments, the message body may include metadata describing the multimedia content and be formatted according to Session Description Protocol (SDP), according to some embodiments.

In some embodiments, the metadata in the header of a SIP message may include information describing the SIP communication session such as a name and a purpose of the SIP communication session, an originator of the SIP session, the types of media content, the protocols, codec formats, timing, transport information, or a combination thereof.

In some embodiments, the packet stream can include a multimedia content stream (e.g., an RTP packet stream) of one or more multimedia content messages, as defined and specified in one or more SIP messages. Therefore, in contrast to end-to-end implementations of SIP where SIP signaling specifies a direct connection between SIP user agents for communication multimedia content, SRC 122 can be configured to intercept all packet streams including SIP messages and multimedia content messages between SIP user agents, according to some embodiments.

In some embodiments, SRC 122 can be configured to establish a recording session with SRS 124 based on metadata of one or more SIP messages received in the packet stream. For example, the metadata in a message body of the one or more SIP messages may include a recording attribute (e.g., an SDP attribute) that requests a recording session. In some embodiments, the recording session is a second SIP communication session where the packet stream is replicated and transmitted from SRC 122 to SRS 124. In some embodiments, SRC 122 and SRS 124 can implement a Session Recording Protocol (SIPREC) to facilitate the recording session.

In some embodiments, SRC 122 can be configured to transmit the SIP messages including metadata of the SIP communication session in the recording session to SRS 124. The transmitted metadata may be generated using SDP, according to some embodiments. In some embodiments, the metadata can include one or more SDP attributes such as a session-level attribute or a media-level attribute. In some embodiments, the media-level attribute includes information about one or more multimedia streams for transmission in the SIP communication session such as protocols (e.g., RTP), encryptions, encodings, archival, etc. In some embodiments, session-level attributes include information that applies to the SIP communication session as a whole rather than to individual multimedia streams. In some embodiments, a session-level attribute can include a security attribute that indicates whether to initiate security processing on the packet stream.

In some embodiments, SRC 122 can be configured to interface with one or more security systems (e.g., security system 130) to access the data threat detection functions provided by the one or more security systems. To do so, SRC 122 may open one or more secure socket connections with one or more corresponding security systems to establish one or more corresponding security sessions. In some embodiments, SRC 122 may determine to open a socket connection with, for example, security system 130 to establish a security session based on the metadata received in SIP messages of the SIP communication session. For example, the metadata may include a security attribute (e.g., an SDP attribute) indicating that security processing is needed for the packet stream. In some embodiments, the socket connection may be a TCP socket connection and includes an IP address and a port of SRC 122 (i.e., a source device) and security system 130 (i.e., a receiver device).

In some embodiments where SRC 122 is configured to interface with security system 130, SRC 122 can transmit metadata describing the SIP communication session to security system 130. In some embodiments, the metadata may include information related to the SIP signaling such as a name and purpose of the SIP communication session, an originator of the SIP communication, a destination of the SIP communication, among other information in a header of the SIP message. In some embodiments, the metadata transmitted by SRC 122 may include metadata in a message body of the SIP message. For example, such metadata may include SDP attributes describing the multimedia communication.

In some embodiments, as will be further described below, security system 130 can determine whether the SIP communication session is associated with a threat based on the metadata describing the SIP communication session. For example, security system 130 may include a reputation-based threat detector 136 that determines a threat status for the SIP communication session based on attributes (e.g., the metadata) describing the SIP communication session. Based on a threat status determined by and received from security system 130, SRC 122 can be configured to control the SIP communication session, according to some embodiments. For example, if the threat status indicates that the SIP communication is high risk or is confirmed to be associated with a cyber threat, then SRC 122 can be configured to terminate the SIP communication session.

In some embodiments, because only metadata of the SIP communication session and not any of the data content (e.g., multimedia messages) is transferred between SRC 122 and security system 130, SRC 122 may require a small bandwidth to maintain the security session. However, because security server 130 may analyze only the metadata, malware hidden in the data content encapsulated in the SIP messages may be undetectable and be transferred between SIP user agents participating in the SIP communication session.

In some embodiments, to remedy the drawbacks with directly initiating a security session between SRC 122 and security server 130, SRC 122 may initiate the security session through SRS 124. In some embodiments, SRS 124 can be a SIP device configured to establish the recording session with SRC 122, as described above. In some embodiments, SRS 124 can associate the recording session with the SIP communication session facilitated by SRC 122. In some embodiments, SRS 124 can be configured to decode the one or more SIP messages in the received packet stream to extract encapsulated data content based on the metadata in the one or more SIP messages. Moreover, SRS 124 may assemble the one or more decoded SIP messages including signaling messages or multimedia messages. In some embodiments, SRS 124 can be configured to decode and decrypt one or more multimedia messages in the packet stream based on the metadata (e.g., media-level attributes) in the SIP messages received in the recording session.

In some embodiments, in response to determining that the metadata includes a request to archive the communication session, SRS 124 can be configured to store decoded data content in session recording database 126. In some embodiments, the decoded data content can include data content extracted from the SIP messages and include, for example, decoded multimedia messages. For example, the data content may be decoded from data encapsulated in a message body of a SIP message. In another example, the data content may be decoded from multimedia messages transmitted in the SIP communication session.

In some embodiments, SRS 124 can be configured to open one or more secure socket connections with one or more corresponding security systems to establish one or more corresponding security sessions based on the metadata received in the recording session. In some embodiments, SRS 124 can open the one or more socket connections if the metadata includes the security attribute indicating that security processing is needed for the packet stream. For example, SRS 124 may open a socket connection with security system 130 to establish a security session. In some embodiments, the socket connection may be a TCP socket connection and includes an IP address and a port of SRS 124 (i.e., a source device) and security system 130 (i.e., a receiver device). In some embodiments, SRS 124 can transmit a portion of the decoded data content to security system 130 based on the socket connection. In some embodiments, SRS 124 can iteratively transmit one or more portions of decoded data content of the packet stream stored in session recording database 126. In some embodiments, because SRS 124 can be configured to also transmit the metadata of the SIP communication session (described above with respect to SRC 122), SIP processing system 120 may need only to establish the security session between SRS 124 and security system 130 and any security sessions established at SRC 122 would be redundant.

In some embodiments, SIP processing system 120 can be implemented as a SBC or a SIP device with integrated SIP ALG, as discussed above. In these embodiments, SRC 122 and SRS 124 may be implemented as software components within SIP processing system 120. For example, the functionality of SRC 122 may be implemented as one or more processes running on SBC or the SIP device.

In some embodiments, security system 130 can be configured to perform security processing on metadata or decoded data content associated with a SIP communication session and received from SIP processing system 120 to determine whether a threat is associated with the SIP communication session. For example, security system 130 may be configured to analyze the metadata received from SRC 122, as described above, to determine whether the SIP communication session is associated with a threat. In another example, security system 130 may be configured to analyze the decoded data content or the metadata received from SRS 124, as described above, to determine whether the SIP communication session is associated with a threat. In some embodiments, the decoded data content can include data content encapsulated in a SIP message or data content from a multimedia message.

In some embodiments, security system 130 can include one or more computing devices to implement one or more data security processing components such as anti-virus scanner 132 (e.g., CLAMAV), intrusion detection system (IDS) 134 (and intrusion prevention system), and reputation-based threat detector 136 to determine whether the metadata and received portion of decoded data content is associated with a security threat.

In some embodiments, anti-virus scanner 132 can include a computer program configured to scan and analyze a received file to determine whether the file is associated with the security threat. In general, anti-virus scanner 132 may generate a signature (e.g., a unique string of bits) for the file to compare with a plurality of signatures stored in a signature database and known to be associated with malicious code such as worms, viruses, Trojans, etc. to detect the security threat. In some embodiments, anti-virus scanner 132 can be initiated to run upon assembling a file from one or more portions of the decoded content received from SIP processing system 120. For example, if the received portion of the decoded content includes a portion of the file, anti-virus scanner 132 may wait until additional portions are received to assemble the file before analyzing the decoded content.

In some embodiments, IDS 134 (and intrusion protection systems) can be configured to analyze packets within the metadata and the portion of decoded data content received from SIP processing system 120 to determine whether the portion of decoded data content is associated with a security threat. In some embodiments, IDS 134 may be configured to implement signature-based detection to analyze specific patterns (e.g., byte sequences or malicious instruction sequences) in the portion of decoded data content and metadata to detect the security threat. In some embodiments, IDS 134 may also implement anomaly-based detection based on applying heuristics or rules to the packets. For example, the security threat may be detected if the portion of decoded data content is determined to be associated with malicious code such as worms, viruses, Trojans, etc.

In some embodiments, reputation-based threat detector 136 can be configured to maintain a database that categorizes security threats for SIP communication sessions or files based on a plurality of attributes. In some embodiments, reputation-based threat detector 136 can be configured to assign security threat levels (or categories) by analyzing a plurality of data sources such as user reports, known malware files and attributes such as IP addresses, generated data signatures, whitelisted identifiers, etc. Accordingly, by querying the database based on received data (e.g., metadata or a portion of decoded data content), reputation-based threat detector 136 can be configured to assign a threat level to the received data and determine whether the received data is associated with a security threat. As described above, because reputation-based threat detector 136 operates on attributes, reputation-based threat detector 136 may be capable of determining whether the SIP communication session is associated with a threat based on metadata describing the SIP communication session. However, to increase the accuracy of reputation-based threat detector 136, reputation-based threat detector 136 may be configured to analyze the metadata as well as one or more portions of decoded data content received from SIP processing system 120.

In some embodiments, security system 130 can be configured to generate a threat status indicating whether the metadata or the portion of decoded data content is associated with a detected security threat. Then, security system 130 can transmit the threat status to SIP processing system 120.

In some embodiments, based on the threat status received from security system 130, SIP processing system 120 (e.g., SRC 122 or SRS 124) can be configured to control the SIP communication session between SIP user agents. For example, if SRS 124 receives a threat status indicating that a threat is detected, SRS 124 may control SRC 122 to terminate the SIP communication session. In some embodiments, SRS 124 can terminate the SIP communication session by transmitting SIP signaling to SRC 122.

In some embodiments, by interfacing SRS 124 with security system 130, SRC 122 can continue to facilitate the SIP communication session between SIP user agents with minimal impact on Quality of Service and processing load on SRC 122. Further, in some embodiments, by utilizing the decoding functionality of SRS 124, SRS 124 can transmit the decoded data content in the packet stream instead of SIP messages to security system 130. As a result, security system 130 may not need to implement SIP processing functionality and can interface with any SIP service providers (e.g., SIP processing system 120) independent of the SIP functions and RFCs implemented by a specific SIP service provider.

Figure 2A:
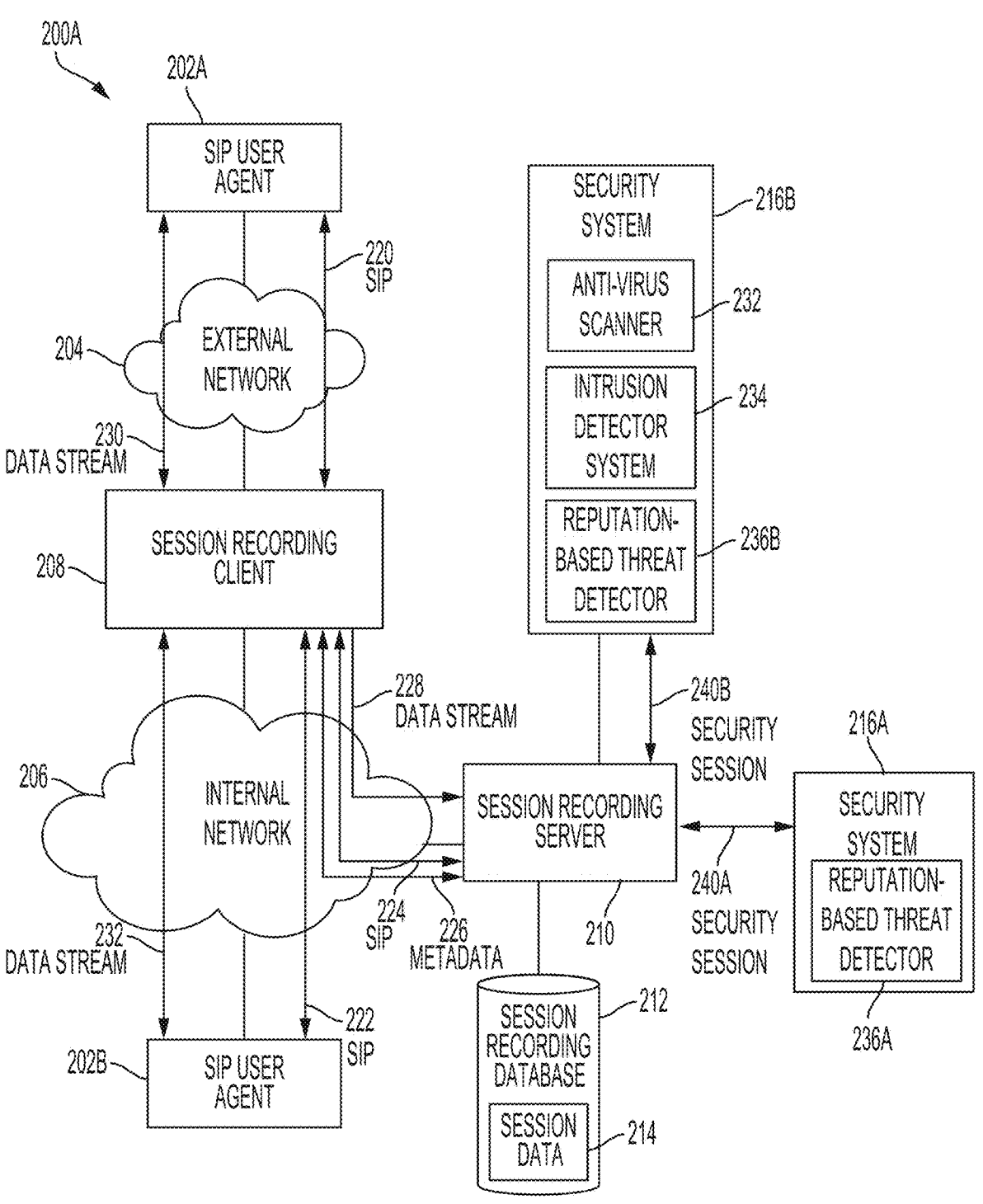
Figure 2B:
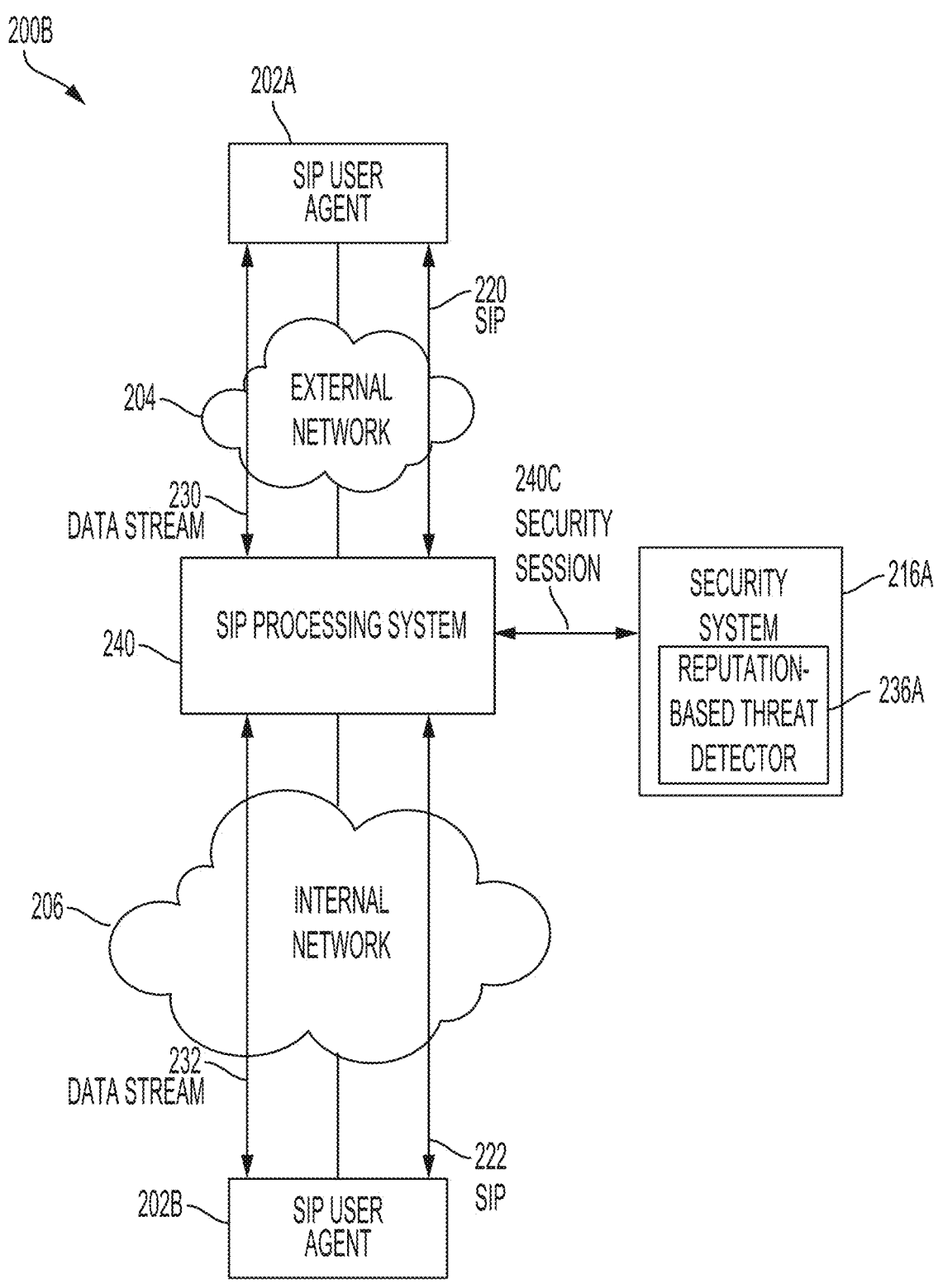

FIGS. 2A-B illustrate systems 200A-B for securing SIP-based communications, according to some embodiments. In some embodiments, each of systems 200A-B can be implemented in the context of the architecture and environment as described above with respect to FIG. 1.

FIG. 2A illustrates a system 200A for securing SIP-based communications by interfacing a Session Recording Client (SRC) 208 (e.g., SRC 122) with a Session Recording Server 210 (e.g., SRS 124). In some embodiments, SRS 208 can be configured to facilitate a SIP communication session between SIP user agent 202A operating in external network 204 (e.g., public network 102) and SIP user agent 202B operating in internal network 206 (e.g., private network 118). In some embodiments, SIP user agent 202A may be, for example, one of user device 114A or IP phones 112A-C in public network 102 and SIP user agent 202B may be, for example, one of user device 114B or IP phone 112D in private network 118.

In some embodiments, SRC 208 can be configured to receive, from SIP user agent 202A, a packet stream including a SIP message stream. In response to determining that the SIP message stream includes a SIP message that requests a SIP communication session with SIP user agent 202B, SRC 208 can establish two SIP communication session legs 220 and 222 to facilitate the SIP communication session between SIP user agent 202A-B. As described above with respect to FIG. 1, the SIP message stream of the SIP communication session can include metadata (e.g., a SDP attribute within a SIP message) indicating various information about the SIP communication session as well as the multimedia packet streams to be transmitted. Like SIP communication session legs 220 and 222, SRC 208 can be configured to establish two data stream legs 230 and 232 to establish a multimedia communication session between SIP user agents 202A-B. In some embodiments, although system 200A is described with respect to two SIP user agents 202A-B, SRC 208 can similarly establish a separate SIP communication session leg and data stream leg with each SIP user agent of three or more SIP user agents to provide a SIP communication session among the three or more SIP user agents.

In some embodiments, in response to determining that the metadata of one or more SIP messages in the SIP message stream indicates that the SIP communication session should be forwarded to SRS 210, SRC 208 can be configured to establish a recording session with SRS 210. In some embodiments, the recording session includes SIP communication session 224, metadata stream 226, and data stream 228. In some embodiments, SIP signaling received from SIP communication session legs 220 and 222 and multimedia content received from data stream legs 230-232 can be replicated and transmitted to SRS 210 in SIP communication session 224 and data stream 228, respectively. In some embodiments, SRC 208 can generate additional metadata in metadata stream 226 for transmitting to SRS 210. Metadata stream 226 can include a first SDP attribute indicating whether session archival is to be performed by SRS 210, according to some embodiments. Metadata stream 226 can include a second SDP attribute indicating whether security processing is to be performed on messages transmitted in SIP communication session leg 222, data stream 228, or both SIP communication session leg 222 and data stream 228.

In some embodiments, the functionality of SRC 208 can be implemented within SIP user agent 202B such as in a SIPREC architecture as described in RFC 7245. In these embodiments, SRC 208 may not need to establish SIP communication leg 222 and data stream leg 232. Further, in these embodiments, SIP user agent 202B may initiate the recording session established with SRS 210.

In some embodiments, SRS 210 (e.g., SRS 124) establishes the recording session with SRC 208 for receiving, within SIP communication session 224, replicated SIP messages of the SIP communication session between SIP user agents 202A-B. In some embodiments, SRS 210 can be configured to receive, within data stream 228, replicated multimedia content messages of the multimedia communication session between SIP user agents 202A-B. As shown in system 200A, SRS 210 can be coupled to SRC via internal network 206. In other embodiments, SRS 210 may be located on external network 204 and SRC 208 can communicate with SRS 210 by establishing a secure connection with SRS 210 through external network 204.

In some embodiments, SRS 210 can decode the one or more SIP messages received in SIP communication session based on metadata in the one or more SIP messages to extract multimedia content encapsulated in the one or more SIP messages. For example, SRS 210 may retrieve a script, algorithm, etc. stored on SRS 210 based on the metadata to extract the multimedia content. In some embodiments, SRS 210 can similarly decode or decrypt multimedia content messages received in data stream 228 based on metadata stream 226. In some embodiments, SRS 210 can be configured to assemble the one or more decoded SIP messages. For example, SRS 210 may assemble the multimedia content extracted from the one or more decoded SIP messages or one or more decoded multimedia content messages.

In some embodiments, SRS 210 can be configured to determine whether to archive session data 214 of the SIP communication session (e.g., SIP communication legs 220-222 and data stream legs 230-232) in session recording database 212. In some embodiments, SRS 210 can determine to archive session data 214 based on metadata stream 226. For example, metadata stream 226 may include a SDP attribute requesting archival of session data 214.

In some embodiments, SRS 210 can be configured to determine whether to establish one or more security sessions 240A-B with one or more security systems 216A-B based on metadata stream 226. For example, metadata stream 226 may include a SDP attribute indicating that security processing needs to be performed on data communicated in the SIP communication session. In some embodiments, SRS 210 can be configured to select one or more security systems 216A-B based on threat detection functionality of security systems 216A-B, data security requirements in metadata stream 226, received data types in data stream 228, or requests in metadata stream 226. For example, by connecting to security system 216A, SRS 210 may access reputation-based threat detector 236A provided at security system 216A. In contrast, by connecting to security system 216B, SRS 210 may access anti-virus scanner 232, IDS 234, and reputation-based threat detector 236B provided by security system 216B. However, reputation-based threat detector 236A may have higher accuracy than reputation-based threat detector 236B. To improve threat detection accuracy, SRS 210 may be configured to connect to, for example, both security systems 216A-B. In response to determining to establish the security session with one or more security systems 216A-B, SRS 210 can be configured to open one or more respective secure socket connections with the one or more security systems 216A-B.

In some embodiments, SRS 210 can be configured to transmit received metadata in SIP communication session 224 as well as a portion of the data content decoded from the SIP messages to security system 130. In some embodiments, SRS 210 can be configured to decode the SIP messages to extract multimedia content. In some embodiments, SRS 210 can iteratively transmit successive portions of the decoded data content to one or more security systems 216A-B. In some embodiments, the portion of the data content to be transmitted can be retrieved from session data 214 stored in session recording database 212. For example, the decoded data content may include multimedia content extracted from the SIP messages of SIP communication session 224 or extracted from the multimedia messages of data stream 228.

In some embodiments, security system 216A can be configured to receive a plurality of portions of data content (e.g., multimedia content) and SIP communication session metadata from SRS 210. In some embodiments, security system 216A can include reputation-based threat detector 236A that analyzes the metadata and optionally one or more portions of the data content to determine if a security threat is detected. In some embodiments, reputation-based threat detector 236A may correspond to reputation-based threat detector 136, as described above with respect to FIG. 1. In some embodiments, security system 216A can transmit a threat status to SRS 210 to indicate whether the received portion of data content or metadata is associated with a detected threat. In some embodiments, security system 216A may be coupled to external network 204 and SRS 210 may communicate with security system 216A through a router (not shown).

In some embodiments, security system 216B can operate similar to security system 216A and be configured to receive a plurality of portions of data content (e.g., multimedia content) and SIP communication session metadata from SRS 210. In addition to implementing reputation-based threat detector 236B, security system 216B may implement other types of threat detection mechanisms such as those provided by anti-virus scanner 232 and IDS 234. In some embodiments, anti-virus scanner 232 and intrusion detection system 234 correspond to anti-virus scanner 132 and IDS 134, respectively, as described above with respect to FIG. 1. In some embodiments, in contrast to reputation-based threat detector 236B, other types of threat detection mechanisms such as anti-virus scanner 232 and IDS 234 may require decoded data content to detect threats. In some embodiments, like security system 216A, security system 216B can transmit a threat status to SRS 210 to indicate whether the received portion of data content or metadata is associated with a detected threat. In some embodiments, security system 216B may be coupled to external network 204 and SRS 210 may communicate with security system 216B through a router (not shown). In some embodiments, based on the received threat status, SRS 210 can be configured to transmit SIP signaling through SIP communication session 224 to control the SIP communication session facilitated by SRC 208. For example, if the threat status indicates a detected threat, SRS 210 may transmit a SIP message to SRC 208 to terminate the SIP communication session between SIP user agents 202A-B.

In some embodiments, upon terminating the SIP communication session in response to the threat status, SRC 208 can be configured to generate and transmit a trap notification to an operator. Upon receiving the trap notification within a user interface configured to control SRC 208, the operator can control the user interface to quarantine one or more servers or SIP user agents. In some embodiments, the trap notification may be displayed within the user interface as an alert.

FIG. 2B illustrates a system 200B for securing SIP-based communications by interfacing a SIP processing system 240 directly with security system 216A. In some embodiments, SIP processing system 240 can be implemented as SRC 208, as described with respect to FIG. 2A. Like SRC 208, SIP processing system 240 can be configured to facilitate a SIP communication session (including SIP communication session legs 220-222 and data stream legs 204-206) between SIP user agent 202A operating in external network 204 and SIP user agent 202B operating in internal network 206. For example, SIP processing system 240 may be a SBC device or a SIP device with integrated SIP ALG that implements B2BUA functionality to allow SIP processing system 240 to not only establish the SIP communication session, but also terminate any SIP signaling or multimedia communication sessions between SIP user agents 202A-B.

In some embodiments, SIP processing system 240 can be configured to implement similar functionality as SRC 208. For example, SIP processing system 240 may establish a recording session with a separate recording device (e.g., SRS 210) for recording data content and SIP signaling transmitted between SIP user agents 202A-B in the established SIP communication session.

In some embodiments, to determine whether the SIP communication session being facilitated is associated with a threat, SIP processing system 240 can be configured to interface with a security system such as security system 216A to access the data threat detection functions (such as reputation-based threat detector 236A) provided by security system 216A. In some embodiments, SIP processing system 240 may open a secure socket connection with security system 216A to establish a corresponding security session 240C.

In some embodiments, SIP processing system 240 can be configured to transmit metadata describing the SIP communication session or describing one or more multimedia communication streams to security system 216A. As described above with respect to FIGS. 1 and 2B, reputation-based threat detector 236A may be able to detect whether the SIP communication session is associated with a threat based on the metadata. Based on the results generated by reputation-based threat detector 236A, security system 216A may generate and transmit a threat status back to SIP processing system 240.

In some embodiments, based on the received threat status, SIP processing system 240 can be configured to terminate the SIP communication session between SIP user agents 202A-B. For example, if the threat status indicates a detected threat, SIP processing system 240 may terminate SIP communication session legs 220-222 and data stream legs 230-232.

In some embodiments, in contrast to SRS 210, SIP processing system 240 may lack the capability to decode SIP messages and multimedia messages to extract decoded data content and assemble the decoded data content. Therefore, SIP processing system 240 may not, for example, have access to threat detection functions provided by anti-virus 232 and IDS 234 of security system 216B, described above with respect to FIG. 2A. As a result, if a security system requires decoded data content as input for threat detection, SIP processing system 240 will not be able to establish a security session to successfully interface with such a security system.

Figure 3:
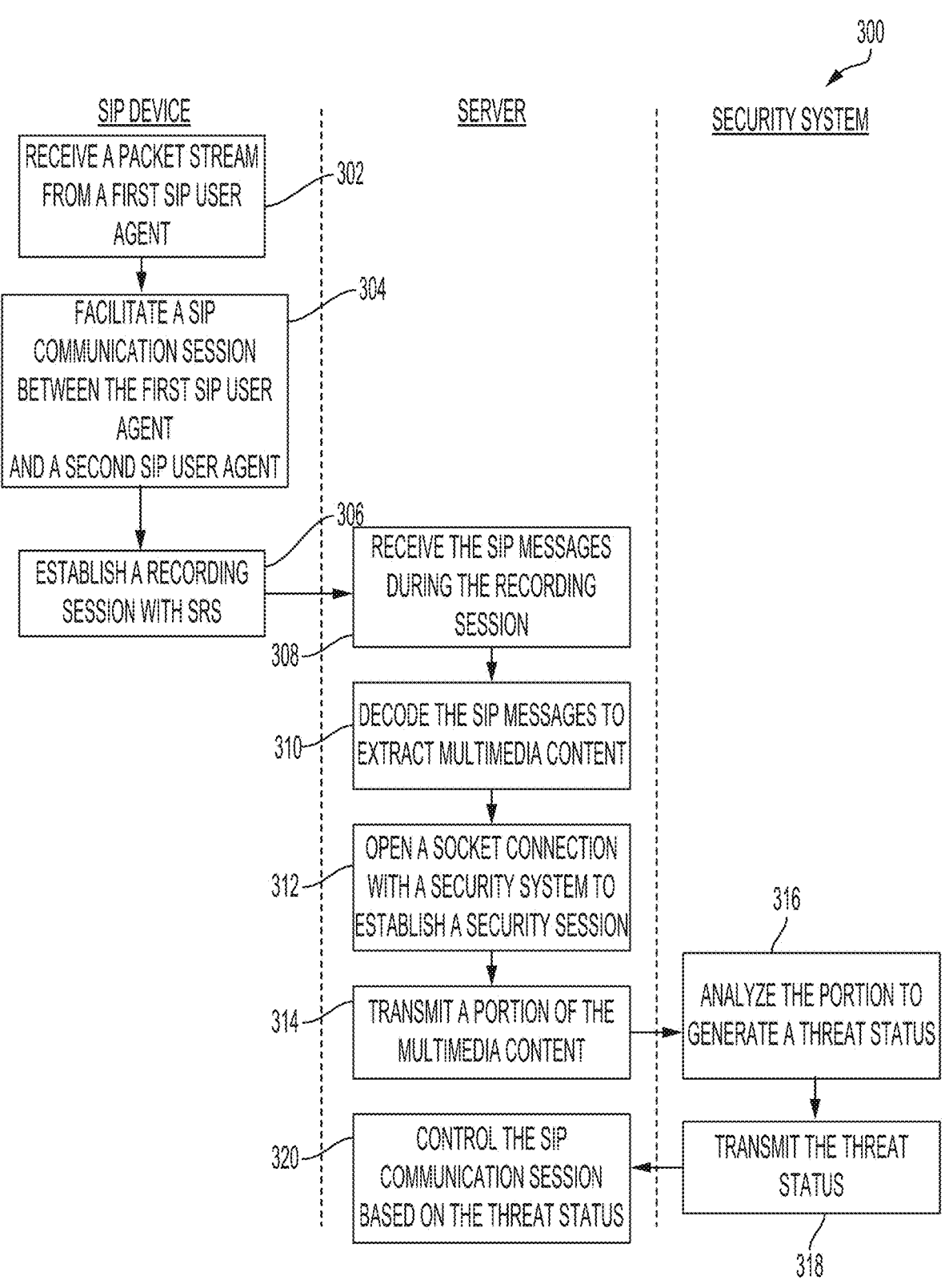
FIG. 3 illustrates a method for securing SIP-based communications, according to some embodiments.

FIG. 3 illustrates a method 300 for securing SIP-based communications, according to some embodiments. Method 300 can be performed by a SIP processing system such as SIP processing system 120 of FIG. 1 or system 200A of FIG. 2A. Accordingly, one or more of the steps below may reference the components of SIP processing system 120 or system 200A such as a Session Recording Client (SRC), a Session Recording Server (SRS), and a security system. Method 300 can be performed by a computing system with one or more processors and a memory (e.g., the computing system 500 illustrated in FIG. 5). Method 300 may be included in one or more programs stored in the memory that, when executed by the one or more processors, cause the one or more processors to perform method 300.

In step 302, a SIP device of the SIP processing system receives a packet stream including a SIP message stream from a first SIP user agent. In some embodiments, the SIP device can be a Session Recording Client (SRC) such as SRC 208 of FIG. 2A. In some embodiments, SIP device can be a Session Border Controller (SBC) or SIP Application Layer Gateway (ALG).

In step 304, the SIP device facilitates a SIP communication session between the first SIP user agent and a second SIP user agent based on one or more SIP messages in the SIP message stream. For example, the SIP device may facilitate the SIP communication session if the one or more SIP messages include a SIP INVITE message with the second SIP user agent. In some embodiments, the SIP communication session is facilitated by establishing a SIP communication leg with each of the first and second SIP user agents. In some embodiments, the SRC relays SIP messages between the first and second SIP user agents through the SIP communication session. In some embodiments, the SIP messages include encapsulated multimedia content, first metadata describing the SIP communication session, and second metadata describing the multimedia content.

In step 306, a server establishes a recording session with the SIP device. In some embodiments, the server can be a Session Recording Server (SRS) such as SRS 210 of FIG. 2A. In some embodiments, the server can be configured to establish the recording session with the SIP device in response to determining that the first metadata or the second metadata indicate that data transmitted in the SIP communication session should be archived. In some embodiments, the recording session is a SIP communication session that is implemented using SIPREC.

In step 308, the server receives the SIP messages from the SIP device during the recording session.

In step 310, the server decodes the SIP messages based on the second metadata to extract the multimedia content from the SIP messages. For example, the multimedia content may be encoded as a binary file within a message body of a SIP message.

In step 312, the server opens a socket connection with a security system to establish a security session based on the first metadata. In some embodiments, the socket connection can be a TCP socket connection. In some embodiments, the first metadata includes an SDP attribute that indicates that security processing needs to be performed on data transmitted in the SIP communication session. In some embodiments, the server can be configured to open a plurality of socket connections with a plurality of corresponding security systems to establish a plurality of corresponding security sessions based on the first metadata, second metadata, or security requirements or policies at the server. Other embodiments for selecting one or more security systems for establishing one or more security sessions are further described above with respect to FIG. 2A.

In step 314, the server transmits a portion of the multimedia content to the security system using the socket connection. In some embodiments, the server can be configured to archive the decoded multimedia content in a session recording database (e.g., session recording database 212), as described above with respect to FIGS. 1-2. In these embodiments, the portion of the multimedia content being transmitted can be retrieved from the archived multimedia content.

In step 316, the security system analyzes the received portion of the multimedia content to generate a threat status indicating whether the portion is associated with a detected threat. In some embodiments, the security system can be configured to compare one or more packets of the portion of multimedia content with a plurality of threat signatures to determine whether the received portion is associated with a security threat, as is further described above with respect to FIGS. 1 and 2A. For example, the security system may run an anti-virus scanner, intrusion detection system, or reputation-based threat analytic on the received portion to detect possible threats. In step 318, the security system transmits the threat status to the server.

In step 320, the server controls the SIP communication session based on the threat status received from the security system. In some embodiments, the server can control the SIP communication session by transmitting SIP signaling to the SIP device configured to facilitate the SIP communication session between the first and second SIP user agents. In some embodiments, when the threat status indicates that a threat is detected, the server can request the SIP device to terminate the SIP communication session. Terminating the SIP communication session can include terminating SIP communication session legs with the first and second SIP user agents as well as terminating data stream legs with the first and second SIP user agents, as described above with respect to FIGS. 1 and 2A.

Figure 4:
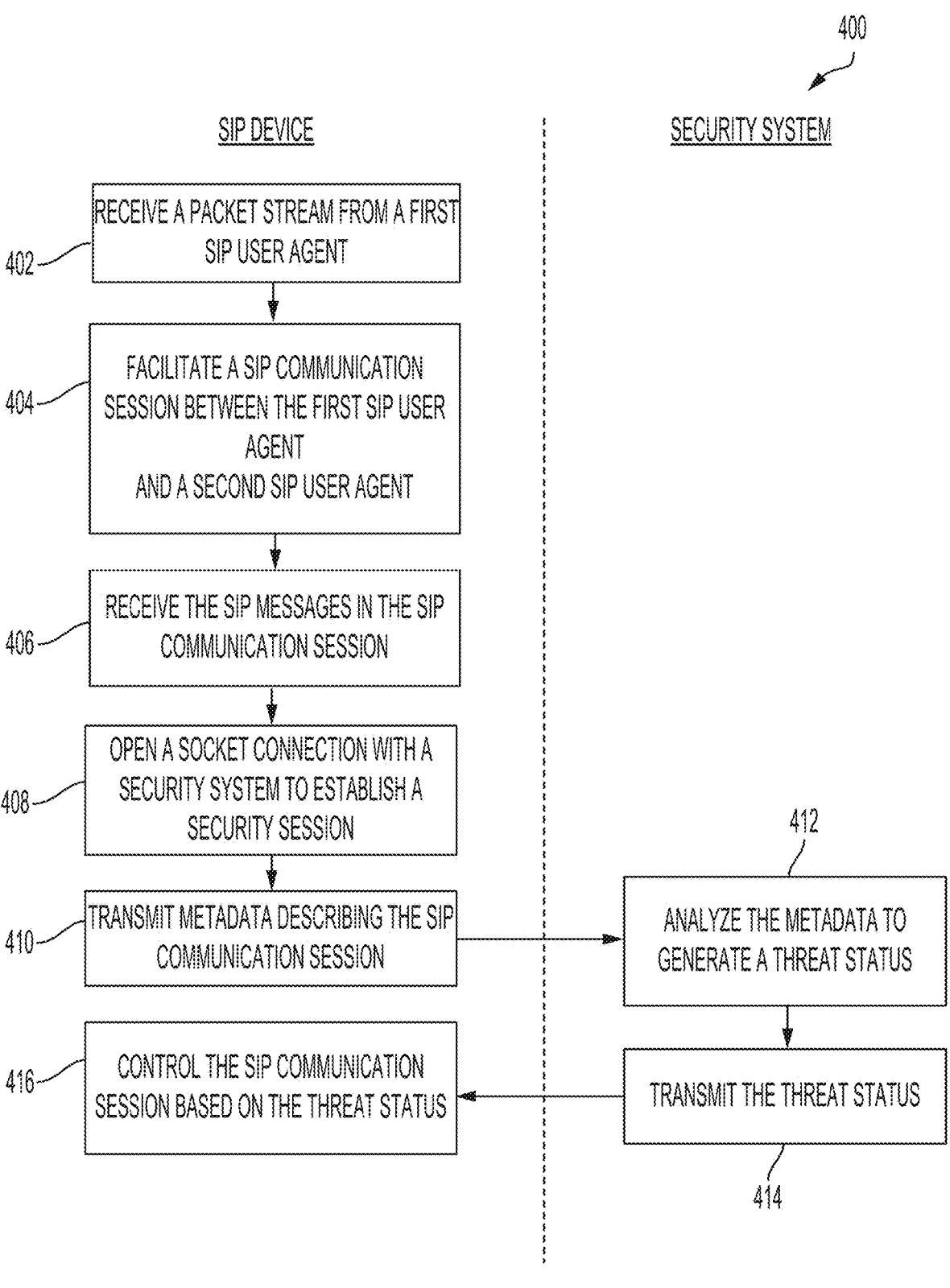
FIG. 4 illustrates a method for securing SIP-based communications, according to some embodiments.

FIG. 4 illustrates a method 400 for securing SIP-based communications, according to some embodiments. Method 400 can be performed by a SIP processing system such as SIP processing system 120 of FIG. 1 or system 200B of FIG. 2B. Accordingly, one or more of the steps below may reference the components of SIP processing system 120 or system 200B. Method 400 can be performed by a computing system with one or more processors and a memory (e.g., the computing system 500 illustrated in FIG. 5). Method 400 may be included in one or more programs stored in the memory that, when executed by the one or more processors, cause the one or more processors to perform method 400.

In step 402, a SIP device of the SIP processing system receives a packet stream including a SIP message stream from a first SIP user agent. Like the SIP device of FIG. 2A, the SIP device here can be a Session Recording Client (SRC) such as SRC 208 of FIG. 2A, a Session Border Controller (SBC), or SIP Application Layer Gateway (ALG).

In step 404, the SIP device facilitates a SIP communication session between the first SIP user agent and a second SIP user agent based on one or more SIP messages in the SIP message stream. In step 406, the SIP device receives the SIP messages in the SIP communication session. In some embodiments, the SIP messages include encapsulated multimedia content, first metadata describing the SIP communication session, and second metadata describing the multimedia content, as described above with respect to step 304 of FIG. 3.

In step 408, the SIP device opens a socket connection with a security system (e.g., security system 216A) to establish a security session. In some embodiments, the socket connection can be a TCP socket connection. In some embodiments, the first metadata includes an SDP attribute that indicates that security processing needs to be performed on the SIP communication session. In some embodiments, the SIP device can be configured to select the security server from a plurality of security servers, further described above with respect to FIG. 2B.

In step 410, the SIP device transmits the first metadata describing the SIP communication session to the security system, as described above with respect to FIG. 2B. In some embodiments, the SIP device transmits the second metadata describing the multimedia communication sessions.

In step 412, the security system analyzes the received metadata (e.g., received first metadata or received second metadata) to generate a threat status indicating whether the metadata indicates that the SIP communication session is associated with a detected threat. In some embodiments, the security system can be configured to run a reputation-based threat detector to determine the threat status based on received metadata, further described above with respect to FIG. 2B. In step 414, the security system transmits the threat status to the SIP device.

In step 416, the SIP device controls the SIP communication session based on the threat status received from the security system. In some embodiments, when the threat status indicates that a threat is detected, the SIP device terminates the SIP communication session between the first and second SIP user agents. Terminating the SIP communication session can include terminating SIP communication session legs with the first and second SIP user agents as well as terminating data stream legs with the first and second SIP user agents, as described above with respect to FIGS. 1 and 2B.

Figure 5:
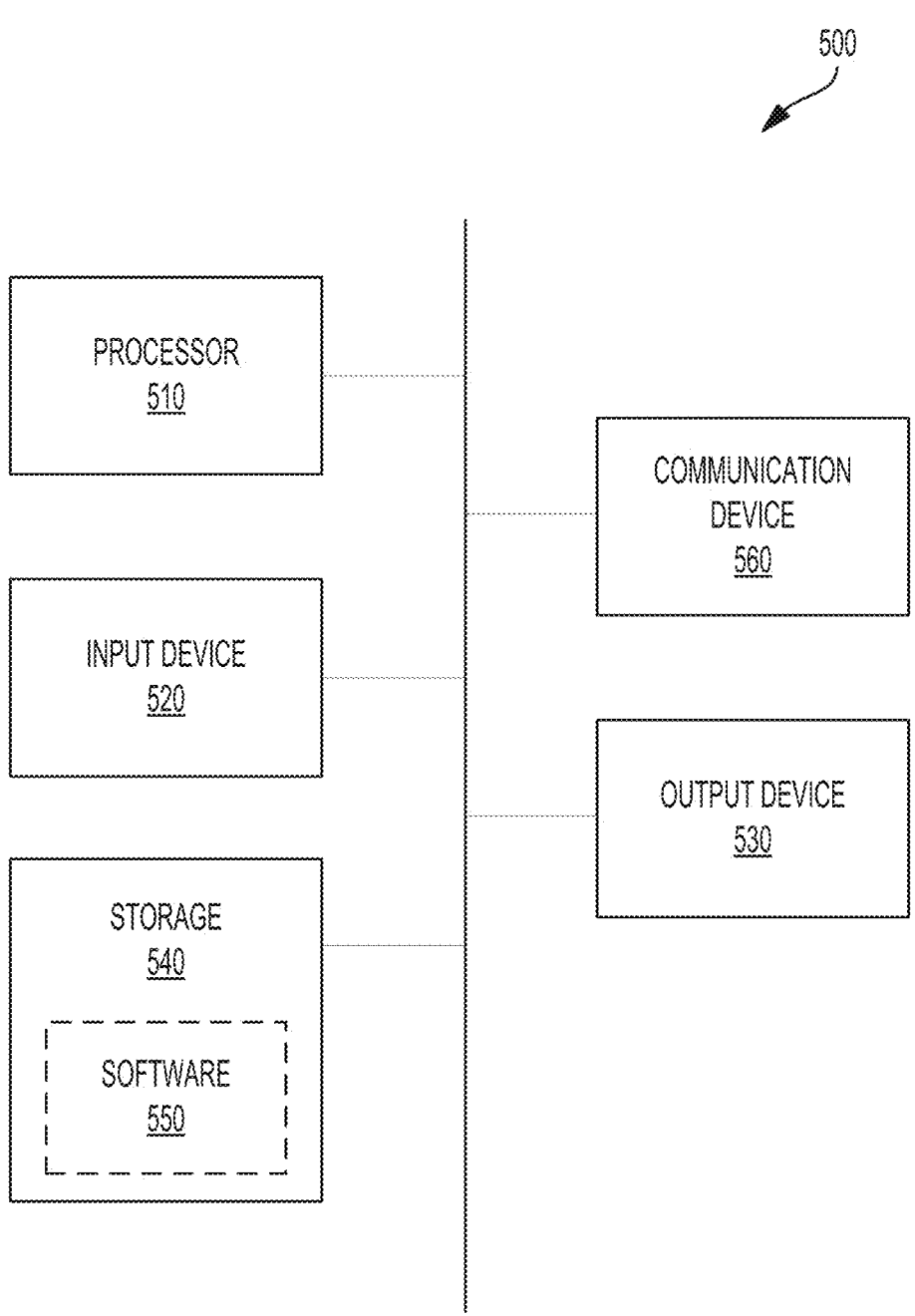
FIG. 5 illustrates an example of a computing system, according to some embodiments.

FIG. 5 illustrates an example of a computing system in accordance with one embodiment. Computing system 500 can be a component of a system for providing SIP network security according to the systems and methods described above, such as SIP processing system 120 of FIG. 1, or can include the entire system itself. In some embodiments, computing system 500 is configured to execute a method for providing SIP network security such as method 300 of FIG. 3.

Computing system 500 can be a host computer connected to a network. Computing system 500 can be a client computer or a server. As shown in FIG. 5, computing system 500 can be any suitable type of microprocessor-based device, such as a personal computer, workstation, server, or handheld computing device, such as a phone or tablet. Computing system 500 can include, for example, one or more of processor 510, input device 520, output device 530, storage 540, and communication device 560. Input device 520 and output device 530 can correspond to those described above and can either be connectable or integrated with computing system 500.

Input device 520 can be any suitable device that provides input, such as a touch screen or monitor, keyboard, mouse, or voice-recognition device. Output device 530 can be any suitable device that provides an output, such as a touch screen, monitor, printer, disk drive, or speaker.

Storage 540 can be any suitable device that provides storage, such as an electrical, magnetic, or optical memory, including a random access memory (RAM), cache, hard drive, CD-ROM drive, tape drive, or removable storage disk. Communication device 560 can include any suitable device capable of transmitting and receiving signals over a network, such as a network interface chip or card. The components of computing system 500 can be connected in any suitable manner, such as via a physical bus or wirelessly. Storage 540 can be a non-transitory computer-readable storage medium comprising one or more programs, which, when executed by one or more processors, such as processor 510, cause the one or more processors to execute methods described herein, such as method 300 of FIG. 3.

Software 550, which can be stored in storage 540 and executed by processor 510, can include, for example, the programming that embodies the functionality of the present disclosure (e.g., as embodied in the systems, computers, servers, and/or devices as described above). In some embodiments, software 550 can include software distributed across a combination of servers such as application servers and database servers.

Software 550 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computing system 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing system 500 can implement any operating system suitable for operating on the network. Software 550 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

In some embodiments, a non-transitory computer-readable storage medium (e.g., storage 540) stores one or more programs (e.g., software 550) configured to be executed by one or more processors of an electronic device, the one or more programs including instructions for implementing any of the steps described or claimed herein. The present disclosure also relates to a device for performing the operations herein. This device may be specially constructed for the required purposes (e.g., an SBC, an IPPBX, or a hardware firewall, etc.), or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers and computer systems referenced in this disclosure may include a single processor or may be architectures employing multiple processor designs for increased computing capability.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for providing Session Initiation Protocol (SIP) network security, comprising:
    receiving at least one SIP message in an SIP communication session between a first SIP user agent and a second SIP user agent;
    opening one or more socket connections with one or more security systems to establish one or more security sessions;
    transmitting a portion of the at least one message to the one or more security systems using the one or more opened socket connections;

receiving a threat status from a security system of the one or more security systems indicating whether the transmitted portion is associated with a detected threat; and
    controlling the SIP communication session based on the received threat status, wherein controlling the SIP communication session comprises at least one of:
        transmitting SIP signaling to an SIP device configured to facilitate the SIP communication session between the first and second SIP user agents, and
        terminating the SIP communication session between the first and second SIP user agents.

2. The method of claim 1, wherein the SIP signaling is transmitted by a server to an SIP device configured to facilitate the SIP communication session between the first and second SIP user agents.

3. The method of claim 1, wherein terminating the SIP communication session comprises terminating SIP communication session legs with the first and second SIP user agents and terminating data stream legs with the first and second SIP user agents.

4. The method of claim 1, wherein the message comprises encapsulated multimedia content, first metadata describing the SIP communication session, and second metadata describing the multimedia content, and wherein the transmitted portion comprises at least one of the first metadata, the second metadata, and the multimedia content.

5. The method of claim 1, wherein the threat status indicates that the transmitted portion is associated with the detected threat.

6. The method of claim 5, wherein the SIP communication session comprises a first communication leg between an SIP device and the first SIP user agent and a second communication leg between the SIP device and the second SIP user agent, wherein terminating the SIP communication session comprises:
    terminating the first communication leg and the second communication leg.

7. The method of claim 1, wherein the threat status indicates that the transmitted portion is associated with the detected threat, comprising:
    notifying the threat status to an operator.

8. The method of claim 1, wherein the first and second metadata comprise Session Decision Protocol (SDP) attributes.

9. The method of claim 8, wherein the first metadata comprises user identifiers of the first and second SIP user agents and a status of the SIP communication session.

10. The method of claim 8, wherein the first metadata comprises a security attribute indicating a need for security processing of the SIP communication session.

11. The method of claim 10, wherein establishing the one or more security sessions comprises:
    in response to receiving the security attribute, opening the one or more socket connections with the one or more the security systems.

12. The method of claim 1, wherein determining whether to establish one or more security sessions comprises:
    determining whether to establish a plurality of security sessions with a plurality of corresponding security systems based on the first metadata and the second metadata.

13. The method of claim 11, comprising:
    in response to determining to establish the plurality of security sessions with the plurality of corresponding security systems, opening a separate socket connection to a corresponding security system for each security session.

14. The method of claim 6, wherein the SIP device comprises a Session Recording Server, a SIP media gateway, a Session Border Controller (SBC), SIP Application Layer Gateway (ALG), a SIP phone, a SIP media server integrated with an application server, or a SIP application server.

15. The method of claim 1, wherein the multimedia content comprises audio data, video data, or textual data.

16. The method of claim 1, wherein the socket connection is a Transport Control Protocol (TCP) socket connection.

17. A system for providing Session Initiation Protocol (SIP) network security, comprising:

one or more processors; and memory storing one or more programs that when executed by the one or more processors cause the one or more processors to:

receive at least one SIP message in an SIP communication session between a first SIP user agent and a second SIP user agent;

open one or more socket connections with one or more security systems to establish one or more security sessions;

transmit a portion of the at least one message to the one or more security systems using the one or more opened socket connections;

receive a threat status from a security system of the one or more security systems indicating whether the transmitted portion is associated with a detected threat; and control the SIP communication session based on the received threat status, wherein controlling the SIP communication session comprises at least one of:

transmitting SIP signaling to an SIP device configured to facilitate the SIP communication session between the first and second SIP user agents; and terminating the SIP communication session between the first and second SIP user agents.

18. The system of claim 17, wherein the SIP signaling is transmitted by a server to an SIP device configured to facilitate the SIP communication session between the first and second SIP user agents.

19. The system of claim 17, wherein terminating the SIP communication session comprises terminating SIP communication session legs with the first and second SIP user agents and terminating data stream legs with the first and second SIP user agents.

20. The system of claim 17, wherein the message comprises encapsulated multimedia content, first metadata describing the SIP communication session, and second metadata describing the multimedia content, and wherein the transmitted portion comprises:

at least one of the first metadata, the second metadata, and the multimedia content.

21. The system of claim 17, wherein the threat status indicates that the transmitted portion is associated with the detected threat.

22. The system of claim 17, wherein the threat status indicates that the portion is associated with the detected threat, and wherein the one or more processors are caused to:

notify the threat status to an operator.

23. The system of claim 17, wherein the first metadata comprises a security attribute indicating a need for security processing of the SIP communication session.

24. The system of claim 23, wherein to establish the one or more security sessions, the one or more processors are caused to:

in response to receiving the security attribute, open the one or more socket connections with the one or more security systems.

* * * * *